United States Patent [19]

Hudson

[11] 4,300,832
[45] Nov. 17, 1981

[54] PHOTOCOPY MACHINES
[75] Inventor: Walter A. Hudson, Fox River Grove, Ill.
[73] Assignee: AM International, Inc., Los Angeles, Calif.
[21] Appl. No.: 151,503
[22] Filed: May 19, 1980
[51] Int. Cl.³ ............................................. G03B 27/30
[52] U.S. Cl. ..................................................... 355/106
[58] Field of Search ................. 355/106, 110, 85, 104, 355/105, 107, 108, 109, 110, 111

[56] References Cited
U.S. PATENT DOCUMENTS 2,641,980  6/1953  Brunk .................................... 355/106
3,702,096  11/1972  Copeland ........................ 355/106 X
3,877,805  4/1975  Heldenbrand et al. .......... 355/106 X Primary Examiner—Richard A. Wintercorn
Attorney, Agent, or Firm—Anthony W. Karambelas; Robert C. Curfiss

[57] ABSTRACT

A photocopy machine is provided comprising an exposure roller for exposing a sensitized copy sheet to an original document to be copied and an applicator roller for applying a developer to the exposed copy sheet to produce a visible image. A drive means is provided for selectively operating the rollers in a first or a second mode of operation. In the first mode of operation, the rollers are positively driven in one direction for making copies and in the second mode of operation the rollers are free wheeling in either direction to facilitate removal of a sheet jam and servicing of the machine.

10 Claims, 6 Drawing Figures

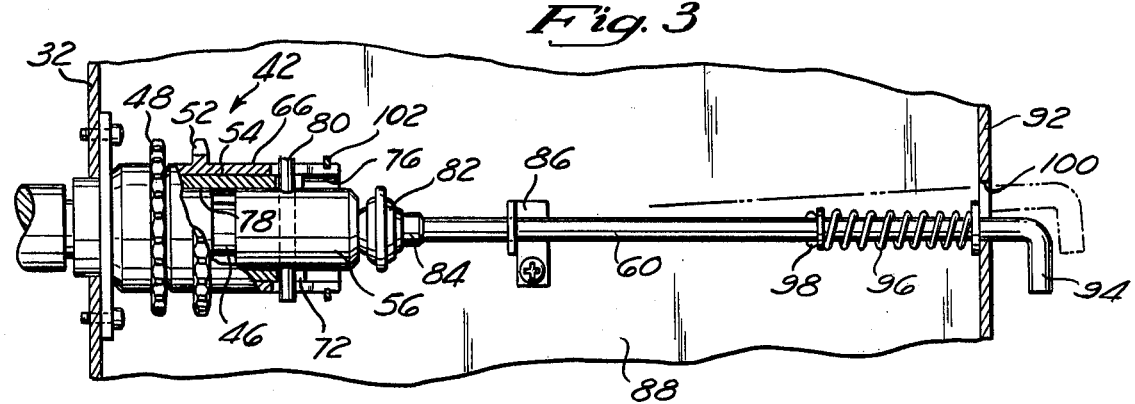
Fig. 3
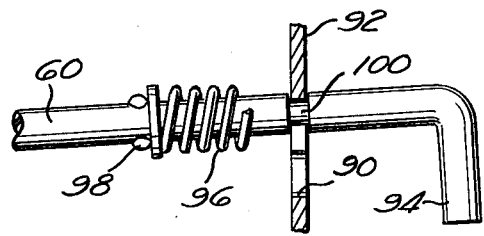
Fig. 4
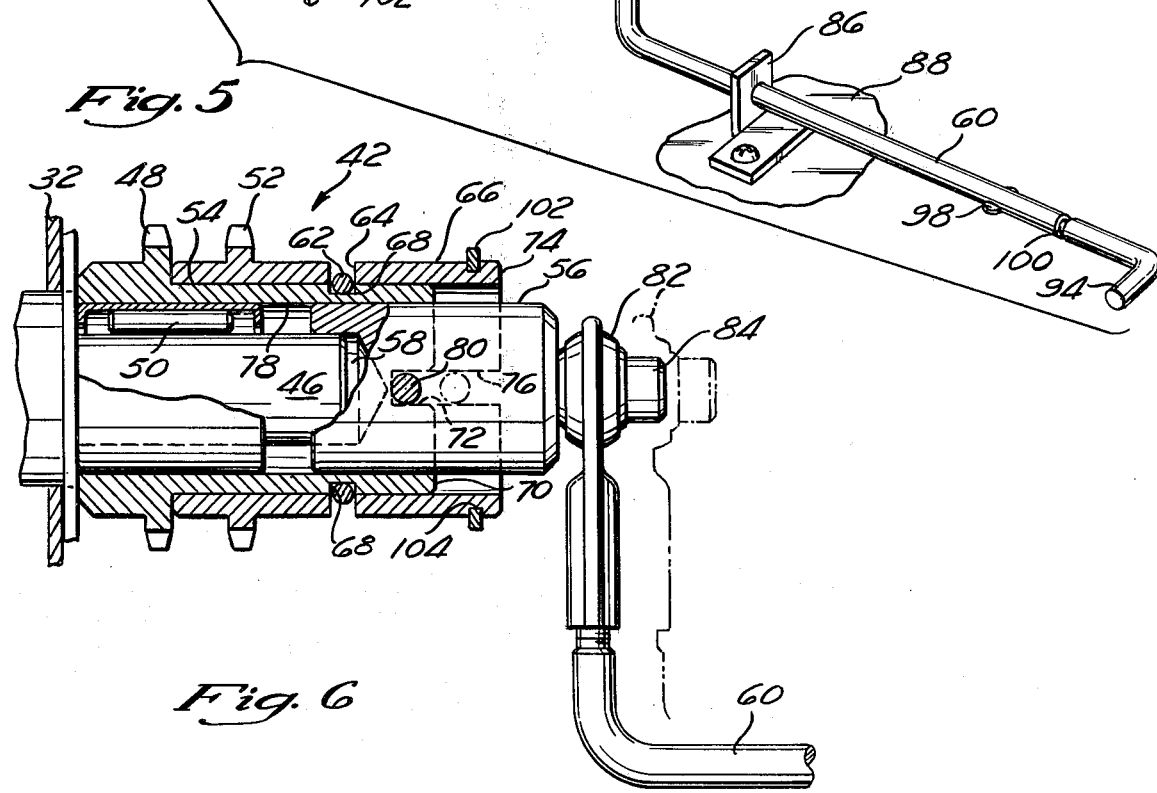
Fig. 5
Fig. 6

PHOTOCOPY MACHINES

BACKGROUND OF THE INVENTION

The invention relates generally to a photocopy machine for exposing and developing diazotype copy materials wherein a liquid developer in metered quantities is applied to the exposed copy material to produce dry to the touch developed copies.

More specifically, the invention relates to a drive means for selectively operating the exposure and applicator rollers in a first mode in which the rollers are positively driven in one direction during normal machine operation when copies are being made, and a second mode in which the rollers are freely rotatable in either direction to facilitate removal of a sheet jam at either of the rollers and servicing of the machine.

In some instances a copy sheet may, instead of existing from the developer section of the machine in the normal manner, tend to cling to the applicator roller and become wrapped around the roller under blades or other developer dispenser and wiper means normally provided for applying and metering the liquid developer on the applicator roller surface. Also, a copy sheet or an original to be copied may, instead of exiting from the exposure section of the machine in the normal manner, tend to cling to the exposure roller. Although an occurrence of this kind is rare, when it does occur it is difficult to remove the wrapped-up copy sheet or original without extensive time and effort. Therefore, it is desirable and an object of the present invention to provide a means to facilitate removal of a sheet jam at either the exposure or the applicator roller.

One arrangement to aid in the removal of a copy sheet jam at the applicator roller only is shown in U.S. Pat. No. 3,702,096 assigned to the same assignee as the present invention. This patent discloses a copy apparatus employing an over-running slip clutch provided in a drive train between the applicator roller and a motor for driving the roller. The motor is selectively energized to operate in either a forward or a reverse direction, and the clutch normally drives the roller in one direction when the motor is energized in an operating mode. When the motor is energized for reversing the direction of driving torque applied to the roller, the roller may be rotated in either direction for relieving a copy sheet jam. When the motor is operating in the reverse direction in the prior art patent, the roller may be manually rotated in either direction as a result of the reverse drive and the action of the over-running clutch.

The prior art device requires special and costly circuitry for reversing the drive of the motor and roller, and insuring that the blades which provide the contact pressures for copying are not brought to bear on the applicator roller, and to insure that the developer fluid is not further applied to the roller. All of the foregoing must be accomplished prior to clearing any sheet jam. This special circuitry adds substantially to the cost of the apparatus.

Still further, the prior art does not provide for operating the apparatus directly to the free wheeling mode when the applicator roller is being driven in a forward direction or when the machine is shut off. Rather, the apparatus can be operated to the free wheeling mode only when the forward drive of the applicator roller is arrested and the motor is energized to operate in a reverse direction, after the machine has shut off. Unlike the present invention which provides for free wheeling of both the exposure and the applicator roller to facilitate servicing of the machine and removal of a sheet jam at either of the rollers, the prior device provides for free wheeling of the applicator roller only.

SUMMARY OF THE INVENTION

The present invention relates to a diazotype copy machine comprising an improved drive and free wheeling assembly, hereinafter termed drive means, for operating the exposure and applicator rollers in a first mode for making copies and in a second mode in which the rollers are free wheeling in either direction. The drive means is selectively controlled for operating the rollers in the first and the second mode. In the second mode of operation each of the rollers is independently free wheeling for manual bi-directional rotation.

The drive means is mounted on a shaft of the applicator roller and comprises a clutch and sprocket assembly including a driver sprocket provided with a uni-directional clutch, a driven sprocket mounted for free rotation on the driver sprocket, a drive element movable between a first and a second position, into and out of driving engagement with the driver sprocket respectively, and a manually operable actuating means for selectively actuating the drive element between the first and second positions.

The clutch and sprocket assembly is rotatably driven by a primary chain trained around the driven sprocket and a sprocket associated with a drive motor. A secondary chain is trained around the driver sprocket and a sprocket associated with a gear train for rotating the exposure roller.

The drive element comprises a drive pin movable into and out of driving engagement with a notch means on the driver sprocket in response to operation of the actuating means. Movement of the drive pin into engagement with the notch means operates the driven sprocket to an active condition in driving engagement with the driver sprocket and movement of the drive pin out of engagement with the notch means operates the driven sprocket to an inactive condition out of driving engagement with the driver sprocket. In the active condition of the driven sprocket the rollers are operated in the first mode in which they are positively driven through the uni-directional clutch in a normal forward direction by the primary chain. In the inactive condition of the driven sprocket the drive pin is disengaged from the notch means thereby disengaging the drive of the uni-directional clutch to permit operation of the rollers in the second mode. The driven sprocket remains in the inactive condition until such time as the actuating means is again operated to move the drive element from the second to the first position, and the drive pin into engagement with the notch means, whereby operation of the rollers is restored to the first mode.

It is an object of the present invention to provide an improved drive means for a photocopy machine for selectively operating the exposure and applicator rollers in a first mode for making copies and in a second mode providing for bi-directional free rotation of both of the rollers to facilitate removal of a sheet jam and servicing of the machine.

Another object is to provide a clutch and sprocket assembly for positively driving the applicator and exposure rollers in one direction for operation in the first mode, and selectively operable actuating means for disengaging the drive for operating the rollers in the second mode.

A feature of the invention is to provide a drive means which is simple in operation and construction, reliable in use and substantially less costly to produce than known prior art devices.

Other objects, features and advantages of the invention will appear hereinafter as the description proceeds.

IN THE DRAWING

FIG. 3 is a plan view of the drive means and an actuating means, partially in section, illustrating the drive element in a first position;

FIG. 4 is a fragmentary plan view of the actuating means shown in a position for actuating the drive element to a second position;

FIG. 5 is an exploded perspective of the drive means and the actuating means; and FIG. 6 is a sectional front elevation of the drive means including a portion of the actuating means.

DESCRIPTION OF THE PREFERRED EMBODIMENT

Figure 1:
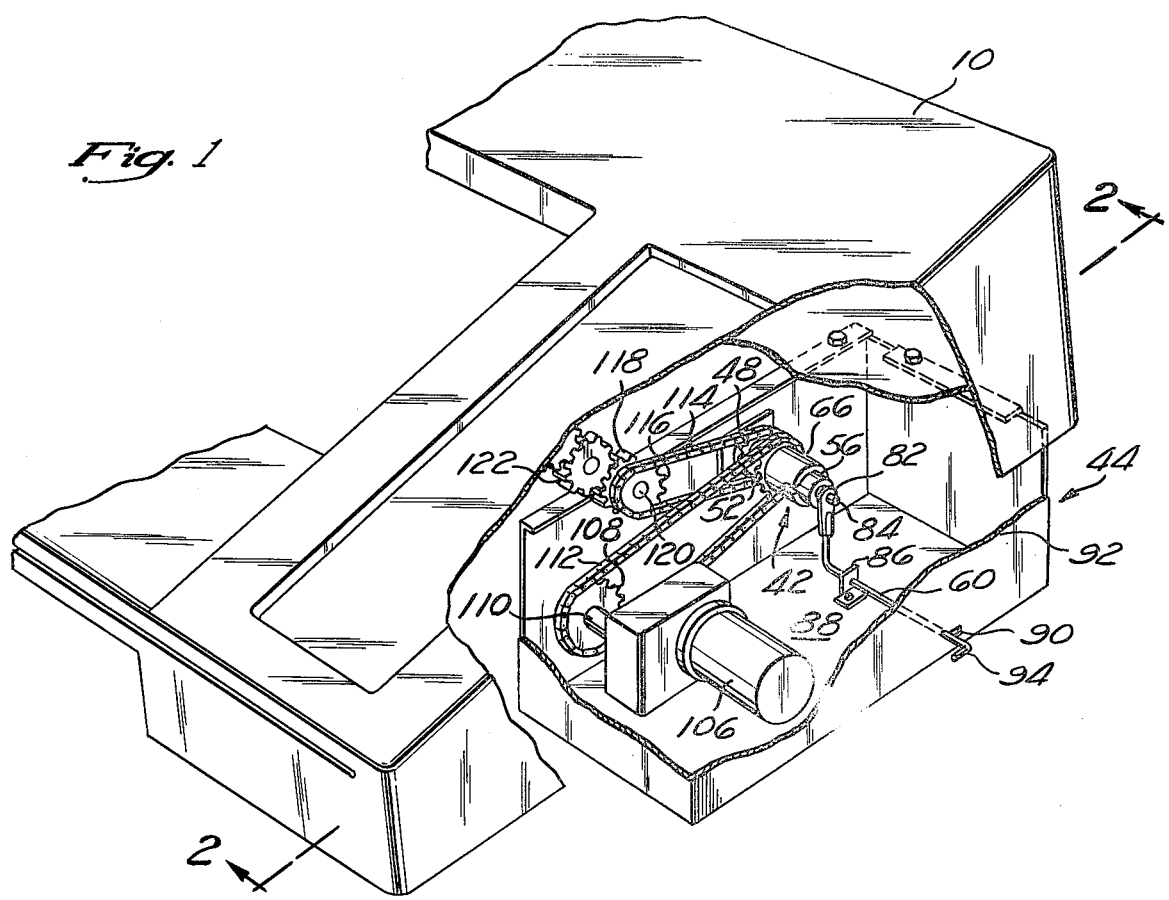
FIG. 1 is a top right-front perspective of a portion of a photocopy machine showing a drive means in accordance with the present invention.
Figure 2:
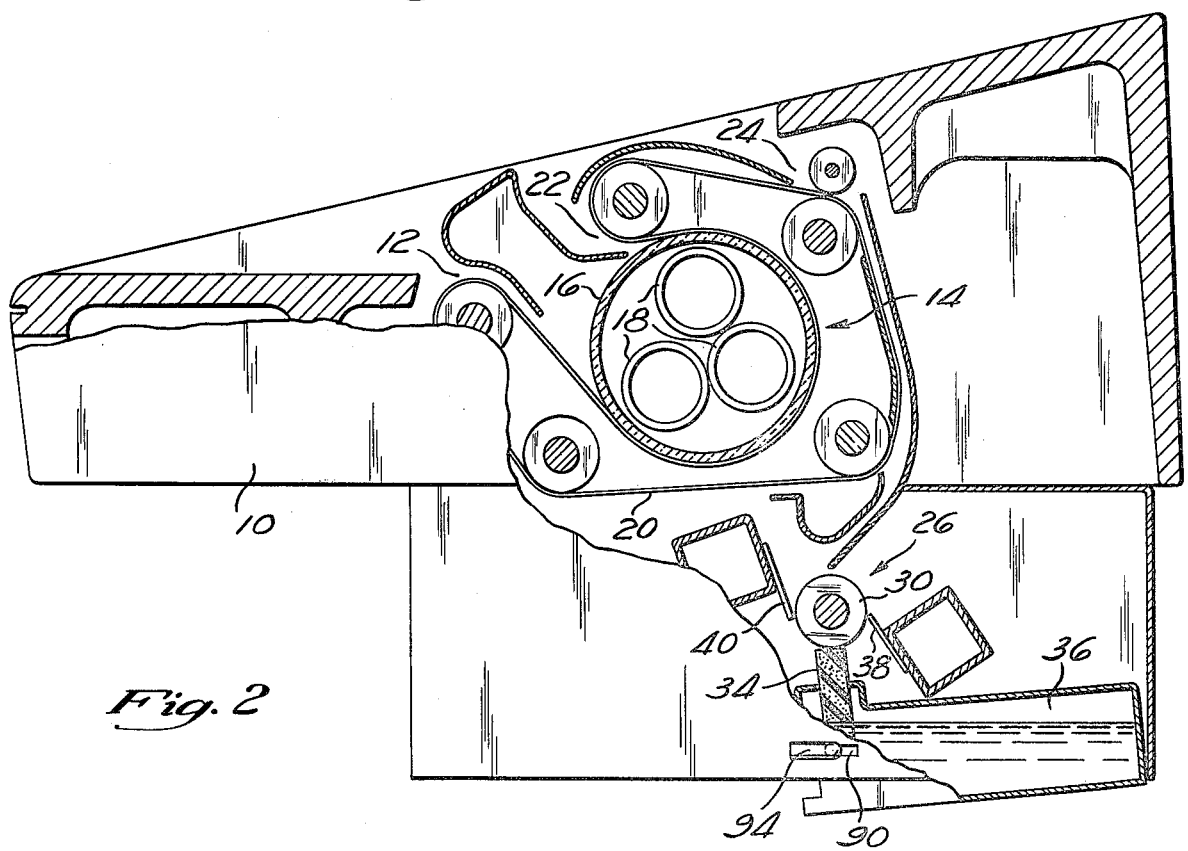
FIG. 2 is an end elevation of the photocopy machine, partially in section, taken substantially along the line 2—2 of FIG. 1.

With reference to FIGS. 1 and 2, there is shown a photocopy machine comprising an outside casing 10 for enclosing various components for exposing and developing diazotype copy sheets. The photocopy machine includes an in-feed station 12 into which a superposed copy sheet and an original document to be copied are fed to an exposure section indicated generally by the reference numeral 14. The exposure section 14 comprises a rotatable transparent exposure roller 16 containing an illumination source 18 for burning-out the sensitized copy sheet which is conveyed around and in contact with the surface of the exposure roller 16 by a carrier belt system 20. The exposed copy sheet and the original document emerge from the exposure section 14 through an exit 22 where the two sheets are intercepted by the machine operator and separated. The latent image bearing copy sheet is then fed through an in-feed station 24 into a developer section indicated generally by the reference numeral 26.

The developer section 26 comprises an applicator roller 30 supported in a pair of side plates, only one side plate 32 being shown in FIGS. 3 and 6. The applicator roller 30 is adapted to carry on its surface a metered quantity of liquid developer supplied thereto by a wick means 34 positioned in a fountain 36 containing a supply of liquid developer as shown in FIG. 2.

Still referring to FIG. 2, a metering blade 38 is provided to remove excess liquid developer from the surface of the applicator roller 30 and is adapted for movement into and out of contact engagement with the surface of the applicator roller. A pressure blade 40 is provided and is also movable into and out of contact engagement with the surface of the applicator roller 30. The pressure blade 40 when in contact with the surface of the applicator roller 30 provides a developing zone between the pressure blade 40 and the surface of the applicator roller 30. A copy sheet to be developed is passed through the developing zone and exits into a receiving tray at the front of the machine, not shown in the drawing.

Referring now to FIGS. 1, 3, 5, and 6, there is shown a drive means comprising a clutch and sprocket assembly indicated generally by the reference numeral 42. The drive means 42 is positioned within an enclosure indicated generally by the reference numeral 44 as shown in FIG. 1 and the enclosure 44 is positioned within the outside casing 10. As best shown in FIG. 6, the drive means 42 is supported on a stub end shaft 46 of the applicator roller 30. Referring to FIGS. 1, 3, 5 and 6, the drive means 42 comprises a driver sprocket 48 provided with a uni-directional clutch 50, a driven sprocket 52 mounted for free rotation on a hub 54 of the driver sprocket 48, a drive element 56 provided with an axial bore 58 of limited depth for receiving a portion of the stub end shaft 46 of the applicator roller 30, and a manually operable actuating means or rod 60. The uni-directional clutch 50 permits the applicator roller 30 to be positively driven in a forward direction only, counterclockwise as viewed in FIG. 2.

The driven sprocket 52 is retained on the hub 54 of the driver sprocket 48 with a retainer clip 62 positioned in a slot 64 provided in a body 66 of the driven sprocket 52 and engaged with an annular groove 68 provided in the hub 54, as shown in FIGS. 5 and 6. An end face 70 of the hub 54 is provided with a pair of aligned notches 72 and an end face 74 of the body 66 is provided with a similar pair of aligned notches 76, also as shown in FIGS. 5 and 6. The notches 72 and 76 are positioned in alignment transverse to the axis of the sprockets 48 and 52 and, in an assembled condition, the notches 72 extend axially to a depth coinciding to the depth of the notches 76.

The drive element 56 is adapted for axial sliding movement within a bore 78 of the driver sprocket 48, as shown in FIGS. 3, 5 and 6 and includes a drive pin 80 coactable with the notches 72 and 76. The rod 60 is secured at one end to a connector 82 mounted on the drive element 56 with a fastener 84, and extends downwardly and outwardly through a support bracket 86 fastened to a bottom 88 of the enclosure 44 and through a keyhole slot 90 (FIGS. 1, 3 and 4) in a sidewall 92 of the enclosure 44. The rod 60 is also provided with a finger grip 94, a spring 96 extending between the sidewall 92 and a stop means 98 on the rod 60, and a neck 100 adapted to coact with the keyhole slot 90.

During normal machine operation when copies are being made, the rod 60 is in the full line position shown in FIG. 3 and the spring 96 urges the rod 60 and the drive element 56 toward the left to maintain the drive pin 80 in driving engagement with the notches 72 of the driver sprocket 48 as shown in full lines in FIG. 6. This is the first position of the drive element 56 and the active condition of the driven sprocket 52 for operating the exposure roller 16 and the applicator roller 30 in the first mode of operation.

By grasping the finger grip 94 and pulling outwardly on the rod 60, toward the right as viewed in FIG. 3, the drive element 56 is moved from the first to a second position outwardly of the bore 78 and the drive pin 80 is moved out of engagement with the notches 72 and into engagement with the notches 76, as shown in phantom lines in FIG. 6. The drive element 56 is maintained in the second position by pivoting the rod 60, about the connector 82, rearwardly from the full line to the phantom line position shown in FIG. 3. The rod 60 is held in this position by the neck 100 coacting with the keyhole slot 90 as shown in FIG. 4 and is effective to maintain the drive pin 80 out of driving engagement with the notches 72. In this second position of the drive element 56, the exposure roller 16 and the applicator roller 30 are in the second mode of operation for manual free wheeling rotation in either direction.

As shown in FIGS. 3, 5 and 6, a retaining ring 102 is provided in a groove 104 of the body 66 to prevent inadvertent withdrawal of the drive element 56 from the bore 78 of the driver sprocket 48, as a result of the drive pin 80 striking the retaining ring 102.

As shown in FIG. 1, a power means or motor 106 is provided for driving a sprocket 108 mounted on a shaft 110, and a primary chain 112 is trained around the sprocket 108 and the driven sprocket 52 for imparting rotation to the driven sprocket when the motor is energized. A secondary chain 114 is trained around the driver sprocket 48 and a sprocket 116 associated with a gear 118 mounted on a shaft 120. The gear 118 is in mesh with a gear 122 which is a part of a gear train (not shown in drawing) for driving the carrier belt system 20 which rotates the exposure roller 16 through frictional engagement therewith.

With the drive element 56 in the first position, and the exposure roller 16 and the applicator roller 30 operating in the first mode, the primary chain 112 drives the driven sprocket 52 and the engagement of the drive pin 80 with the notches 72 imparts rotation to the driver sprocket 48. The uni-directional clutch 50 is effective to impart positive rotation to the applicator roller 30 in a forward direction only, counterclockwise as viewed in FIG. 2, and the secondary chain 114 imparts rotation to the exposure roller 16 in the same direction.

In the event of a sheet jam at either the exposure roller 16 or the applicator roller 30, or for purposes of servicing the machine, the rollers 16 and 30 may be operated to the second mode by actuating the rod 60 from the solid line position shown in FIG. 3 to the phantom line position, or to the position shown in FIG. 4, to thereby actuate the drive element 56 from the first to the second position and withdraw the drive pin 80 out of driving engagement with the notches 72. This action operates the driven sprocket 52 to the inactive condition, and disengages the driving connection of the driven sprocket 52 from the driver sprocket 48, and the rollers 16 and 30 are operable in the second mode in which they are free wheeling in either direction. During operation of the rollers 16 and 30 in the second mode, the primary chain 112 continues to rotate the driven sprocket 52. However, because the drive connection of the drive pin 80 is disengaged from the notches 72, the driven sprocket 52 is freely rotated on the hub 54 of the driver sprocket 48 and is ineffective to impart driving rotation to the driver sprocket 48, the exposure roller 16 and the applicator roller 30.

The second mode for free wheeling operation of the rollers 16 and 30 permits manual bi-directional rotation of the rollers for removing a sheet jam or for servicing the machine. The uni-directional clutch 50 controls rotation of the roller 30 in the forward or counterclockwise direction as viewed in FIG. 2 and, in response to manual rotation of the roller 30 in the opposite direction, the driving force of the uni-directional clutch 50 is disengaged thereby permitting free wheeling of the rollers 16 and 30. The bi-directional rotation of the roller 30 may be effected by hand rotation of the rollers or, in the case of a sheet jam, by pulling on the sheet wrapped around the roller.

Although the device of the present invention provides for altering the operation of the rollers 16 and 30 from the first to the second mode of operation while the machine is either in an on condition or shut down, in practice, operation of the rollers in the second mode while the machine is in the on condition is normally used as a servicing tool in trouble-shooting drive problems and the like and not for purposes of removing a sheet jam. Removal of a sheet jam is normally performed with the machine shut down or in an off condition.

It will be appreciated, while the foregoing disclosure sets forth an arrangement for simultaneously conditioning both the exposure roller 16 and the applicator roller 30 for bi-directional free wheeling operation, with but minor modifications the apparatus may be converted to provide for bi-directional free wheeling of the applicator roller 30 only. Such modifications may be readily made by removing the secondary chain 114 and its associated drive and altering the gear train, provided for driving the carrier belt system 20, to be driven by the motor 106. With these modifications, only the applicator roller 30 would be operable in the second mode of operation to permit manual bi-directional free wheeling of the roller to facilitate removal of a copy sheet jam and servicing of the machine.

From the foregoing, it will be appreciated that the present invention provides an improved drive means for a photocopy machine for positively driving the exposure and applicator rollers in one direction for making copies, and for conditioning the rollers for bi-directional free rotation to facilitate removal of a sheet jam and servicing of the machine.

If desired, with but minor modifications the machine may be readily altered to provide for free wheeling of the applicator roller only.

Additionally, the apparatus is simple in construction, reliable in operation and substantially less costly to produce than known devices of this kind. Thus, the device of the present invention substantially eliminates the costly mechanism and electrical circuitry associated with prior art devices by utilizing a manually actuable drive means for altering the operation of the exposure and applicator rollers between the first mode of operation which obtains when copies are being made and a second mode of operation which permits free wheeling of the applicator and exposure rollers, or the applicator roller only, in either direction.

Although specific mechanisms and conditions are set forth in the above description, these are merely illustrative of the present invention. Other modifications and/or additions will readily occur to those skilled in the art upon reading the disclosure, and these are intended to be encompassed within the spirit of the invention.

What is claimed is:

1. In a photocopy machine including roller means adapted to be positively rotated in one direction defining a first mode of operation and freely rotatable in either direction defining a second mode of operation, drive means for the roller means, comprising:

driver means including a uni-directional clutch for positively rotating the roller means;

driver means rotatably mounted on the driver means operable between an active condition in driving engagement with the driver means for operating the roller means in the first mode, and an inactive condition out of driving engagement with the driver means for operating the roller means in the second mode;

drive element means actuable between a first position for operating the driven means in the active condition and a second position for operating the driven means in the inactive condition;

hub means provided on the driver means including an axial bore for supporting the drive element means in its movement between the first and the second position;

means for selectively actuating the drive element means between the first and the second position; and power means for rotating the driven means.

2. Drive means as set forth in the claim 1 further comprising:

notch means provided in the driver means and the driven means; and drive pin means provided on the drive element means coacting with the notch means of the driven means in response to actuation of the drive element means to the second position, and coacting with the notch means of the drive means in response to actuation of the drive element means to the first position.

3. Drive means as set forth in claim 1 in which the hub means is provided on the driver means for rotatably supporting the driven means thereon further comprising:

means for retaining the driven means against axial displacement on the hub means.

4. Drive means as set forth in claim 1 further comprising:

means provided on the driven means to prevent inadvertent withdrawal of the drive element means from the axial bore in response to actuation of the drive element means to the second position.

5. Drive means as set forth in claim 1 in which the driven means comprises a driven sprocket, further comprising:

sprocket means associated with the power means; and chain means trained around the driven sprocket and the sprocket means for rotatably driving the driven sprocket.

6. Drive means as set forth in claim 1 further comprising:

biasing means for urging the drive element means to the first position; and means for maintaining the drive element means in the second position against the action of the biasing means.

7. Drive means as set forth in claim 1 in which the roller means comprises an applicator roller and an exposure roller, and the driver means comprises a driver sprocket, further comprising:

shaft means associated with the applicator roller for supporting the driver sprocket thereon;

sprocket means associated with the exposure roller; and chain means trained around the driver sprocket and the sprocket means for rotatable driving the exposure roller in the first mode of operation.

8. Drive means as set forth in claim 1 in which the roller means comprises an applicator roller and an exposure roller, and the driven means comprises a driven sprocket, further comprising:

first sprocket means associated with the power means;

second sprocket means associated with the exposure roller; and chain means trained around the driven sprocket and the first and second sprockets for rotatably driving the applicator and exposure rollers.

9. In a photocopy machine including an exposure roller for exposing a sensitized copy sheet and an applicator roller for developing the exposed copy sheet, drive means for positively rotating the rollers in one direction for making copies defining a first mode of operation and for permitting free rotation of the rollers in either direction to facilitate removal of a sheet jam defining a second mode of operation, the drive means comprising:

a driver sprocket including a uni-directional clutch associated with the applicator roller;

a driven sprocket rotatably mounted on the driver sprocket operable between an active condition in driving engagement with the driver sprocket for operating the rollers in the first mode, and an inactive condition out of driving engagement with the driver sprocket and freely rotatable in either direction for operating the rollers in the second mode;

drive element means actuable from a first to a second position for operating the driven sprocket to the inactive condition and from the second to the first position for operating the driven sprocket to the active condition;

hub means provided on the driver sprocket including an axial bore for supporting the drive element means in its movement between the first and the second position;

means for selectively actuating the drive element means between the first and the second position; and power means for rotating the driven sprocket.

10. Drive means as set forth in claim 9 further comprising:

an end face provided on the hub means;

body means having an end face provided on the driven sprocket;

first notch means provided in the end face of the hub means and extending axially thereto;

second notch means provided in the end face of the body means and extending axially thereto;

said first and second notch means being positioned in alignment transverse to the axis of the driver and driven sprockets; and drive pin means provided on the drive element means positioned in the second notch means, said drive pin means being movable into driving engagement with the first notch means in response to actuation of the drive element means from the second to the first position, and movable out of driving engagement with the first notch means in response to actuation of the drive element means from the first to the second position.

* * * * *